United States Patent [19]
Luong et al.

[11] Patent Number: 5,313,606
[45] Date of Patent: May 17, 1994

[54] SYSTEM FOR DETECTING BOUNDARY CROSS-OVER OF INSTRUCTION MEMORY SPACE USING REDUCED NUMBER OF ADDRESS BITS

[75] Inventors: Tuan Luong; James S. Blomgren; Winnie Yu, all of San Jose, Calif.

[73] Assignee: Chips and Technologies, Inc., San Jose, Calif.

[21] Appl. No.: 642,977

[22] Filed: Jan. 17, 1991

[51] Int. Cl.⁵ .................................................. G06F 12/14
[52] U.S. Cl. .................................. 395/425; 364/246.7; 364/251.1; 364/261.3; 364/969.1; 364/960.6; 364/938; 364/DIG. 1; 395/575; 371/2.2
[58] Field of Search ................ 371/2.2, 16.1; 395/400, 395/425, 575

[56] References Cited

U.S. PATENT DOCUMENTS

| | | |
|---|---|---|
| 3,938,096 | 2/1976 | Brown et al. .................... 364/200 |
| 4,251,860 | 2/1981 | Mitchell et al. .................. 364/200 |
| 4,385,352 | 5/1983 | Bienvenu ......................... 364/200 |
| 4,763,248 | 8/1988 | Kitada ............................. 364/200 |
| 4,882,701 | 11/1989 | Ishii ................................. 364/900 |
| 4,987,537 | 1/1991 | Kawata ............................ 364/200 |
| 5,101,484 | 3/1992 | Kohn ................................ 395/375 |
| 5,109,334 | 4/1992 | Kamuro ........................... 395/400 |
| 5,138,617 | 8/1992 | Edwards ......................... 371/16.1 |

Primary Examiner—Parshotam S. Lall
Assistant Examiner—Ken S. Kim
Attorney, Agent, or Firm—Townsend and Townsend Khourie and Crew

[57] ABSTRACT

An improved system for checking for segmentation violations counts the total number of bytes accessed from the control segment following a control transfer operation. If the count indicates that a part of an instruction is fetched from outside the control segment a limit exception occurs.

1 Claim, 2 Drawing Sheets

SYSTEM FOR DETECTING BOUNDARY CROSS-OVER OF INSTRUCTION MEMORY SPACE USING REDUCED NUMBER OF ADDRESS BITS

BACKGROUND OF THE INVENTION

Segmentation of memory is utilized in some processors to organize the virtual address space into a logical structure that resembles the user's view of memory. Segment sizes can conform to the size of logical procedures and modules utilized in block structured languages such as Pascal and C. Accordingly, segments differ from pages because they are not of fixed length.

A logical address comprises a portion specifying a segment number and an effective address portion specifying an offset into the segment. The segment number is utilized to access a segment descriptor in a segment table. The segment descriptor includes the real base address of the segment and a limit value defining the size of the segment.

In microprocessors such as the Intel 80386 the program instructions are stored in a control segment of memory and a fetch of an instruction from outside the control segment, i.e., a segmentation violation, could cause a serious program malfunction. Accordingly, the addresses of fetched instructions must be checked to determine whether the addresses are included in the control space.

In the 80386 the translation from a logical address to a physical address is done by a Segmentation Unit. While it translates, the Segmentation Unit checks for segmentation violations.

One method of checking for segmentation violations is to use a comparator for processing in parallel the number of bits necessary to determine whether the offset specified by the effective address is greater than the limit number in the descriptor. If the limit number is $2^n$ then the comparator must compare two n-bit numbers to check for segmentation violations.

A substantial saving in the amount of logic required in the segmentation unit results if a smaller comparator can be utilized for limit checking.

SUMMARY OF THE INVENTION

A system for limit checking that utilizes an m-bit adder, where m is an integer smaller than the number of bits in a full address, instead of an ALU of the full address width. Accordingly, substantial reduction of the logic required for limit checking is achieved.

According to one aspect of the invention, an indication of whether a target address is included in a terminal block of the control segment is stored. If the target address is included in the terminal block a negative number equal to the difference between the effective address and the limit value is stored as a DELTA value. This value is incremented by the instruction length of each instruction sequentially executed. If the DELTA value exceeds zero then the address of the instruction byte being fetched is outside of the control space and a limit exception occurs.

According to another aspect of the invention, if the target address is not in the terminal block a ZERO is stored as the DELTA value. A pseudo-jump operation is performed when the DELTA value counts out to determine whether the next sequential instruction address is included in the terminal block.

Other features and advantages of the invention will become apparent in view of the appended figures and following detailed description.

DETAILED DESCRIPTION OF THE PREFERRED EMBODIMENTS

Figure 1:
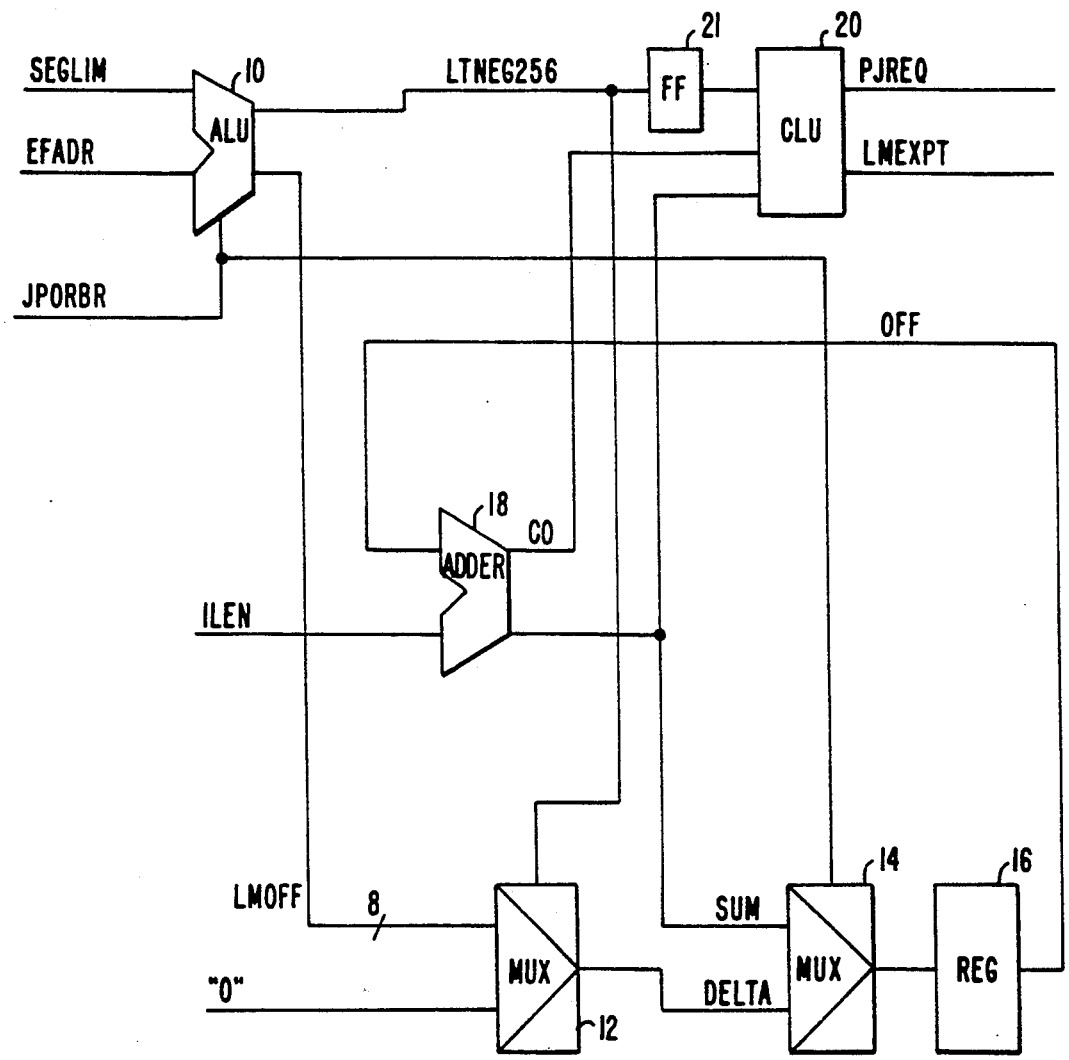
FIG. 1 is a block diagram of an embodiment of the invention.

FIG. 1 is a schematic diagram of digital system for implementing the invention. The following table is a list of signal name abbreviations.

TABLE

| | |
|---|---|
| SEGLIM | A digital signal indicating the size of a segment. |
| EFADR | The effective target address of a control transfer instruction. |
| JPORBR | An signal asserted when a control transfer instruction, such as a branch or jump, generates a target address. |
| LTNEG256 | A signal asserted when a target instruction is within 256 bytes of the terminal address of the control segment. |
| PJREQ | A signal asserted to request a pseudo jump operation. |
| LMEXP | A signal asserted to indicate the occurrence a limit exception. |
| ILEN | A digital signal indicating the length of the instruction being executed. |
| CO | The carry-out signal from an adder. |
| SUM | A digital signal indicating the value of a sum formed by an adder. |
| LMOFF | A digital signal encoding a negative value equal the difference of effective address and the limit value. |
| OFF | A digital signal indicating the offset the address value of an instruction being executed from the terminal address of an address block in the control space. |
| DELTA | A digital signal having a value equal to the difference between a target address and the terminal address if the target address is within 256 bytes of the terminal address or equal to ZERO otherwise. |

In FIG. 1, an arithmetic logic unit (ALU) 10 has its inputs coupled to the SEGLIM and EFADR signal lines, and outputs coupled to a LTNEG256 signal line and a LMOFF signal line. A first multiplexer (MUX) 12 has inputs coupled to the LMOFF signal line and a constant signal line tied to the value ZERO, a control port coupled to the LTNEG256 signal line, and an output coupled to a DELTA signal line. A second MUX 14 has a first input port coupled to the DELTA signal line, a second input port coupled to a SUM signal line and an output coupled to the input of a DELTA register 16. An ADDER 18 has a first input coupled to the output of the DELTA register 16 by a DIFF signal line, a second input coupled to a ILEN signal line, a sum output coupled to the SUM signal line and a carry output coupled to the CO signal line. A CONTROL LOGIC UNIT (CLU) 20 has inputs coupled to a flip-flop 21, which couples LTNEG256 to the CLU 20, CO, and SUM signal lines and outputs coupled to the PJREQ and LMEXP signal lines.

Figure 2:
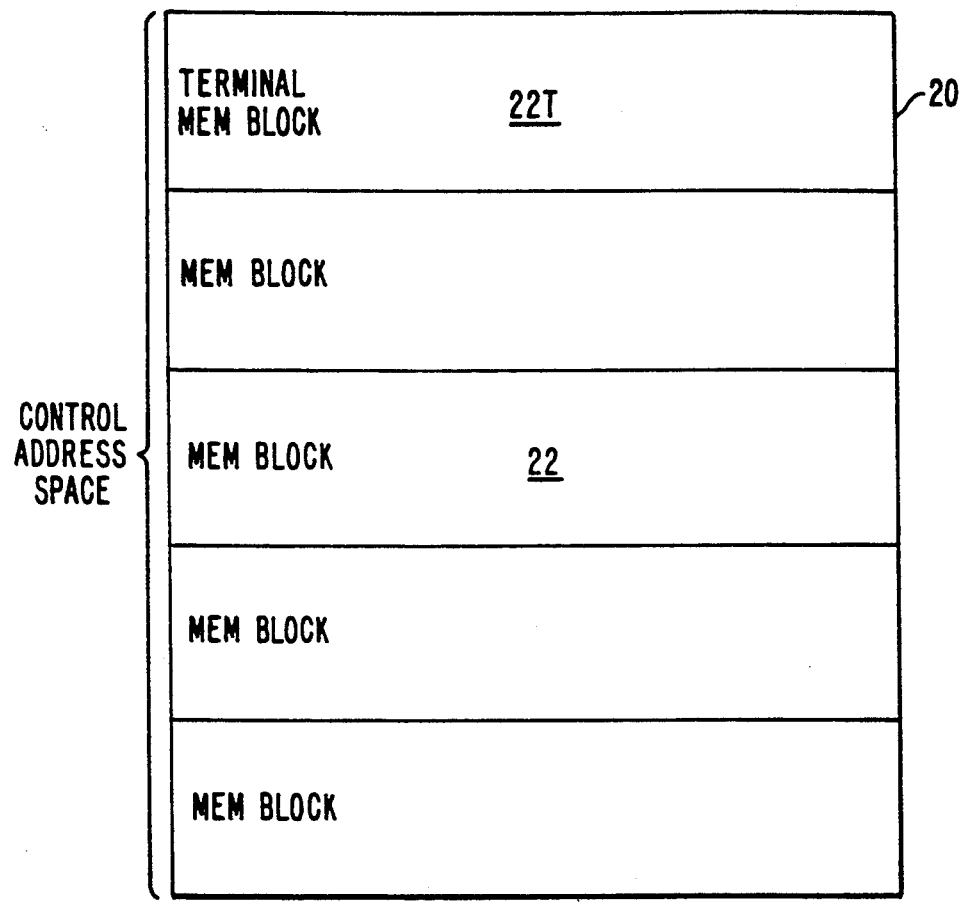
FIG. 2 is a schematic diagram of the control space.

An overview of the operation of the system will now be described with reference to FIG. 2. In FIG. 2, the control address space 20 of the control segment is depicted with the value of the addresses increasing in the vertical direction. The smallest address in the space is the segment base address which specifies the beginning of the control segment. The largest address in the space is the segment terminal address, equal to the sum of the segment base address and a limit value, which specifies the end of the control segment. L The control space is divided into blocks 22 of 256 bytes each. For a 32-bit address, the lower 8 bits specify the offset into a block 22 and the upper 24 bits identify the base address of a block 22. If a target address is located in the terminal block 22T then the address of the instructions executed sequentially following the target instruction will be outside the control space when the value of the block offset part of the instruction address (the lower 8 bits) exceeds 256.

Accordingly, an 8-bit counter can be utilized to perform the limit check for sequentially executed instructions following the execution of a control transfer instruction provided that it can be determined when the target address resides in the terminal block 22T.

The operation of the system of FIG. 1 will now be described for the case where the target address is included in the terminal block. When a control transfer instruction is executed, the signal JPORBR is asserted to cause the ALU 10 to subtract SEGLIM from EFADR and assert LTNEG256 if the difference is less than 256. Accordingly, when LTNEG256 is asserted the effective target address is included in the terminal block 22T.

The assertion of LTNEG256 causes the first MUX 12 to transfer the lower 8 bits of LMOFF to the DELTA signal line and sets a LTNEG256 bit in the flip-flop 21. These lower 8 bits now form the DELTA signal specifying the negative offset of the target address from the block terminal address. The assertion of JPORBR causes the second MUX 14 to transfer the DELTA signal to the DELTA register 16. The output of the DELTA register is the OFF signal. For a target address the value of OFF is equal to DELTA.

As instructions following the target instruction are sequentially executed the instruction length of each instruction being executed (ILEN) is a added to OFF in the 8-bit adder to form the SUM signal which is reloaded into the DELTA register 16. Thus, the value of the SUM signal, which becomes the next value of the OFF signal, indicates the negative offset of the effective address of the next instruction to be executed from the terminal address of the terminal section 22T. When the value of SUM exceeds ZERO, the carry out bit (CO) of the 8-bit adder is set to indicate that the address exceeds the terminal address of the control space. When the CLU 20 receives the CO signal and the LTNEG256 flip-flop 21 is set the CLU 20 asserts LMEXP to indicate that a limit exception has occurred.

Next, the case where the subtraction of SEGLIM from EFADR indicates the target address is not within 256 bytes of the terminal address will be described. The signal LTNEG256 signal is not asserted and the LTNEG256 bit in the flip-flop 21 is not set. The ZERO value is loaded into the DELTA counter to allow the maximum number of sequential instructions to be executed before CO is asserted. When the CLU 20 receives the CO signal and the LTNEG256 bit is not set the CLU 20 asserts the PJREQ signal to cause a pseudo-jump to occur.

Once the OFF value exceeds 256 it is not known how close the address of the instruction being executed is to the terminal address. Accordingly, the pseudo-jump operation asserts JPORBR to cause SEGLIM to be subtracted from the full 32-bit address of the sequential instruction currently being executed. If the difference is less than 256 LTNEG256 is asserted otherwise it is not.

A special case occurs when the SUM value from the adder is exactly equal to ZERO and LTNEG256 flip-flop bit is asserted and a CO occurs. In that case the instruction being executed extends to the limit of the control segment but is still included in the control space. However, if another instruction is sequentially fetched it will not be included in the control segment.

Accordingly, when the CO signal is set the CLU does not assert LMEXP signal if the value of the SUM signal is ZERO and LTNEG256 flip-flop 21 is asserted. However, if another instruction is sequentially fetched LMEXP signal is asserted.

In the preferred embodiment the full 32-bit ALU 10 is utilized during a pseudo-jump operation. Thus, the use of the ALU during pseudo-jump operations causes a slight decrease in the instruction throughput. However, the reduction in hardware for performing limit check by utilizing the 8-bit adder and hardware shown in FIG. 1 more than compensates for this slight degradation.

The invention has now been described with reference to a preferred embodiment. Substitution and modifications will now be apparent to persons of ordinary skill in the art. For example, a positive offset from the terminal address could be used as DELTA and the instruction lengths of sequentially executed instructions subtracted from DELTA to generate OFF. Accordingly, it is not intended to limit the invention except as provided by the appended claims.

What is claimed is:

1. In a data processor that fetches instructions from a designated control segment of memory, with the segment accessed by addresses in a control segment address space beginning at a base address and ending at a terminal address equal to a limit value added to the base address, where the data processor generates a first control signal when a control transfer instruction is executed or when a second control signal is generated, an improved system for determining whether the address of an instruction to be fetched is included in the control segment address space, said system comprising:

means for generating, in response to a received first control signal, status information indicating whether a received target address of an instruction included in the control address space is in a terminal block, with the terminal block comprising a predetermined number ($2^m$) of bytes addressable by an m-bit address, of the control address space, with the terminal block address space ending at the terminal address and beginning at a terminal block base address offset from the terminal address by the predetermined number, where said predetermined number is smaller than said limit value;

means, coupled to said means for generating, for storing said status information;

means for calculating an m-bit DELTA value equal either to the difference between said terminal address and said target address that specifies the negative offset of said target address from said terminal block starting address if said stored status information indicates that said target address is included in the terminal block or equal to zero if said stored status information indicates that said target address is not included in said terminal block;

m-bit processing means, coupled to said means for calculating, for incrementing the DELTA value by the length of each instruction sequentially executed by the data processor to output an incremented DELTA signal; and logic means, coupled to said means for incrementing and to said means for storing said status information, for either signaling a limit exception when said stored status information indicates that said target address is included in said terminal block and said incremented DELTA value is greater than zero or for generating a second control signal to cause said first control signal to be generated when said incremented DELTA value becomes greater than zero and said stored status information indicates that said target address is not included in said terminal block; and with said means for generating said status information responsive to said first control signal caused to be generated by said logic means to revise said stored status information to indicate whether the address of an instruction being executed when the value of DELTA becomes greater than zero is included in said terminal block.

* * * * *